(12) United States Patent
Caritu

(10) Patent No.: US 11,060,972 B2
(45) Date of Patent: Jul. 13, 2021

(54) METHOD FOR ANALYSING A GAS

(71) Applicant: ELICHENS, Grenoble (FR)

(72) Inventor: Yanis Caritu, Saint-Joseph-de-Riviere (FR)

(73) Assignee: ELICHENS, Grenoble (FR)

( * ) Notice: Subject to any disclaimer, the term of this patent is extended or adjusted under 35 U.S.C. 154(b) by 0 days.

(21) Appl. No.: 16/329,965

(22) PCT Filed: Sep. 1, 2017

(86) PCT No.: PCT/FR2017/052322
§ 371 (c)(1),
(2) Date: May 16, 2019

(87) PCT Pub. No.: WO2018/042135
PCT Pub. Date: Mar. 8, 2018

(65) Prior Publication Data
US 2019/0265158 A1     Aug. 29, 2019

(30) Foreign Application Priority Data

Sep. 5, 2016    (FR) ...................................... 1658243

(51) Int. Cl.
*G01N 21/3504*     (2014.01)
*G01J 3/10*     (2006.01)
(Continued)

(52) U.S. Cl.
CPC ............ *G01N 21/3504* (2013.01); *G01J 3/10* (2013.01); *G01J 3/108* (2013.01); *G01J 3/42* (2013.01);
(Continued)

(58) Field of Classification Search
CPC .................................................. G01N 21/3504
(Continued)

(56) References Cited

U.S. PATENT DOCUMENTS 4,560,873 A    12/1985   McGowan et al.
5,705,816 A *   1/1998   Ronge .................... G01N 21/39
                                                                250/345
(Continued)

FOREIGN PATENT DOCUMENTS

CN        104062265 A     9/2014
JP         2-17429 A     1/1990
(Continued)

OTHER PUBLICATIONS

International Search Report dated Dec. 8, 2017 in PCT/FR2017/052322 filed on Sep. 1, 2017.

*Primary Examiner* — Tarifur R Chowdhury
*Assistant Examiner* — Omar H Nixon
(74) *Attorney, Agent, or Firm* — Oblon, McClelland, Maier & Neustadt, L.L.P.

(57) ABSTRACT

The invention relates to a method for analyzing gas by an optical method, according to which a gas sample, comprising gaseous species for which it is desired to determine the quantity, is subjected to an illuminating radiation generated by a light source. The method comprises detecting a radiation having crossed the gas, by means of a light sensor. According to the invention, the light source produces different successive illuminations, such that at each illumination, the spectrum of the illuminating radiation varies. During each illumination, the intensity of the radiation detected by the light sensor is recorded. A processor can estimate a quantity of each gaseous species as a function of the respective intensities measured during each illumination. The invention also relates to a gas analysis device implementing the method.

12 Claims, 3 Drawing Sheets

(51) Int. Cl.
  *G01J 3/42*        (2006.01)
  *G01N 21/31*       (2006.01)
  *G01N 21/359*      (2014.01)
  *G01J 3/28*        (2006.01)

(52) U.S. Cl.
  CPC ....... *G01N 21/314* (2013.01); *G01N 21/3151* (2013.01); *G01N 21/359* (2013.01); *G01J 2003/2866* (2013.01)

(58) Field of Classification Search
  USPC ......................................................... 356/409
  See application file for complete search history.

(56)           References Cited

U.S. PATENT DOCUMENTS

| | | | |
|---|---|---|---|
| 5,731,581 | A | 3/1998 | Fischer et al. |
| 5,920,069 | A | 7/1999 | Fischer et al. |
| 2003/0210715 | A1* | 11/2003 | Lokai ................... H01S 3/1392 372/20 |
| 2007/0029487 | A1 | 2/2007 | Wong et al. |
| 2007/0029488 | A1 | 2/2007 | Wong |
| 2008/0139906 | A1* | 6/2008 | Bussek ................ G01N 21/314 600/322 |
| 2008/0179530 | A1* | 7/2008 | Liu ........................ G01N 21/39 250/343 |
| 2009/0213380 | A1 | 8/2009 | Appel et al. |
| 2009/0213381 | A1 | 8/2009 | Appel et al. |
| 2010/0223015 | A1 | 9/2010 | Phillips et al. |
| 2011/0175520 | A1* | 7/2011 | Ramer ................... F21K 9/232 313/501 |
| 2013/0075093 | A1* | 3/2013 | van Hal ................ E21B 49/081 166/264 |
| 2013/0125618 | A1* | 5/2013 | Hiranaka .............. G01N 21/783 73/23.3 |
| 2013/0219999 | A1* | 8/2013 | Casey ................... F04B 19/006 73/61.48 |
| 2014/0192347 | A1* | 7/2014 | Koulikov ............... G01N 21/39 356/72 |
| 2014/0204382 | A1* | 7/2014 | Christensen ......... G01N 21/031 356/402 |
| 2015/0099274 | A1* | 4/2015 | Axelrod ................ C12M 41/46 435/39 |
| 2015/0288141 | A1* | 10/2015 | Fallahi .................. H01S 5/4087 372/20 |
| 2015/0300948 | A1* | 10/2015 | Buchtal ..................... G01J 3/42 356/454 |
| 2016/0084757 | A1* | 3/2016 | Miron .................. G01N 21/031 356/437 |
| 2016/0209410 | A1* | 7/2016 | Fukushima ...... G01N 33/54386 |
| 2016/0231239 | A1* | 8/2016 | Kotidis ................. H01S 5/0622 |
| 2016/0274077 | A1* | 9/2016 | Perkins ..................... G01J 3/12 |

FOREIGN PATENT DOCUMENTS

| | | |
|---|---|---|
| JP | 2-82137 A | 3/1990 |
| WO | WO 2007/064370 A2 | 6/2007 |

* cited by examiner

METHOD FOR ANALYSING A GAS

TECHNICAL FIELD

The technical field of the invention is the analysis of a gas via an optical technique.

PRIOR ART

Recourse is quite frequently made to optical techniques for analyzing a gas. Devices allow the composition of the gas to be determined based on the fact that the constituent species of a gas have absorption spectral properties that are different from one another. Thus, if an absorption spectral band of a gaseous species is known, its concentration may be determined via an estimate of the amount of light absorbed as it passes through the gas, using the Beer-Lambert law. This principle allows the concentration of a gaseous species present in a medium to be estimated.

Patent application WO2007064370 is based on such a principle. This document describes a device for analyzing a gas comprising a light source and a light sensor. An optical filter is placed between the light source and the light sensor. This filter has narrow passbands, typically of width smaller than 500 nm, corresponding to the absorption spectral bands of the gaseous species to be detected. Such a filter is referred to as a multiband filter. However, such a configuration has certain drawbacks. Firstly, it is expensive to manufacture an optical filter having narrow passbands that are separated from one another. Furthermore, the manufacture of such a filter may present technical difficulties. This document moreover indicates that, as the number of spectral bands increases, it becomes increasingly difficult to envision using such a filter. In addition, this configuration is not versatile and works only for the gaseous species corresponding to the manufactured optical filter. It is not possible to quantify the concentration of a gaseous species the absorption spectral band of which does not correspond to a passband of the filter, unless the filter is changed. Moreover, certain gaseous species have absorption spectral bands that overlap. The use of multiband filters does not allow them to be separated and the device does not allow these species to be differentiated, i.e. a concentration of each of these species to be determined.

Document US2009/213380 describes a gas-analyzing device, in which a gas is successively illuminated with various illumination spectra, using one light source. On each illumination, the illumination spectrum of the gas is modified by successively placing various filters between the light source and the gas to be analyzed. Such a device requires a plurality of filters to be successively used, between the light source and the gas, this assuming mechanical means are present that allow the various filters to be switched between. It will be understood that such a configuration is complex and not suitable for a compact and inexpensive gas detector. It is furthermore assumed that the gaseous species present in the gas will be known beforehand, so as to allow the filters employed to be selected.

The present invention allows these drawbacks to be overcome as it provides a device and method for analyzing a gas that are simple, inexpensive, and able to address various gaseous species, including gaseous species the absorption spectral bands of which overlap. In addition, the device is easily adaptable to various gas mixtures; it is not necessary to manufacture a multiband filter specific to each studied gas mixture. Moreover, the number of gaseous species present in the mixture is not limited by the design constraints of a filter.

SUMMARY OF THE INVENTION

One subject of the invention is a method for analyzing a gas, in order to estimate an amount of a plurality of different gaseous species, called the candidate gaseous species, potentially present in the gas, each candidate gaseous species being able to absorb light radiation in an absorption spectral band, the method comprising the following steps:
  a) placing the gas between a light source and a light sensor, the light source being able to emit illuminating radiation that propagates through the gas, the light sensor being able to detect radiation transmitted by the gas and to deliver a detection signal representative of an intensity of the detected radiation;
  b) illuminating the gas using the light source, the illuminating radiation lying in a spectral band, called the illumination spectral band, covering the absorption spectral band of a plurality of candidate gaseous species, the illuminating radiation having a spectrum, called the illumination spectrum;
  c) during the illuminating step, detecting, with the light sensor, radiation transmitted by the gas, in at least one detection spectral band extending continuously between a minimum wavelength and a maximum wavelength;
  d) reiterating steps b) and c), while adjusting the light source such that, in each step b), the illumination spectrum is modified, notably in the same illumination spectral band;
  e) estimating an amount of each of the candidate gaseous species depending on the intensities of the radiation detected in each illuminating step, respectively, each intensity being associated with one illumination spectrum;

the method being characterized in that, in step c), the detection spectral band covers absorption spectral bands of a plurality of candidate gaseous species.

By absorption spectral band, what is meant is a wavelength range in which the absorption is higher than a set threshold. For example, when the absorption is quantified by a molar absorption coefficient, and absorption spectral band corresponds to a wavelength range, notably a continuous wavelength range, in which the absorption is higher than 50 or even 100 or 200 $Mol^{-1} cm^{-1}$. Those skilled in the art will understand that an absorption spectral band is a spectral interval flanked by a minimum wavelength and a maximum wavelength, and in which the absorption of the gaseous species in question is significant. A gaseous species may have various absorption spectral bands spaced apart from one another.

By absorption spectral function, what is meant is a variation in an absorption property of a gaseous species as a function of wavelength.

By transmitted radiation, what is meant is radiation having passed through the gas between its emission by the source and its detection by the light sensor.

By illumination spectrum, what is meant is a distribution of the intensity of the illuminating radiation as a function of wavelength.

At least two candidate gaseous species may have a molar absorption coefficient higher than 50 $Mol^{-1} cm^{-1}$ in the detection spectral band.

Step e) may comprise forming comparison indicators representing a comparison between:
- the intensity of the radiation detected by the light sensor in each step c) following an illumination of the gas with an illumination spectrum;
- an estimate of said intensity dependent on amounts of the candidate gaseous species;

step e) also comprising determining an overall criterion of comparison from the comparison indicators, the amounts of the candidate gaseous species being those for which the overall criterion of comparison tends toward a preset value. A comparison indicator is thus associated with each illumination spectrum, i.e. each iteration of steps b) and c). Each estimate of the intensity of the detected radiation may then be obtained by:
- associating, with each candidate gaseous species, an absorption spectral function dependent on the amount of each candidate gaseous species;
- taking into account an intensity of the radiation emitted by the light source; the estimate of the intensity of the detected radiation being obtained by multiplying the intensity of the illuminating radiation emitted by the light source by the absorption spectral functions of each candidate gaseous species.

The method may comprise, prior to step e), defining, based on prior knowledge, candidate gaseous species liable to be present in the gas. Steps b) and c) are preferably reiterated at least as many times as the number of candidate species to be sought. The method may comprise any one of the following features, whether in isolation or in combination:
- the light source is a source that emits light radiation the illumination spectrum of which, in the illumination spectral band, varies as a function of a temperature of said source, such that, in each step b), the temperature of the source varies;
- the light source comprises elementary light sources that are able to be activated independently of each other, so as to allow the illumination spectrum to be modulated in the illumination spectral band;
- the detection spectral band is comprised between 200 μm and 10 μm or between 1 μm and 10 μm;
- during at least two illuminations, the illumination spectrum comprises a first wavelength and a second wavelength, the ratio of the intensity of the illuminating radiation at the first wavelength to the intensity of the illuminating radiation at the second wavelength being different between the two illuminations;
- two absorption spectral bands of two candidate gaseous species at least partially overlap;
- the intensity of the illuminating radiation emitted by the light source is determined by an auxiliary light sensor.

Another subject of the invention is a device for analyzing a gas, comprising:
- a light source, able to emit light radiation, the light source also being able to be modulated such that the spectrum of the emitted light radiation, called the illumination spectrum, is variable, notably in a given illumination spectral band;
- a light sensor, able to detect light radiation in a detection spectral band;
- a chamber, able to receive the gas, the chamber possibly comprising the light source and the light sensor, such that the light sensor is configured to detect light radiation emitted by the light source and having passed through the gas;
- a processor, able to implement step e) of a method such as described in this patent application, on the basis of the radiation detected by the light sensor.

FIGURES

DESCRIPTION OF PARTICULAR EMBODIMENTS

Figure 1:
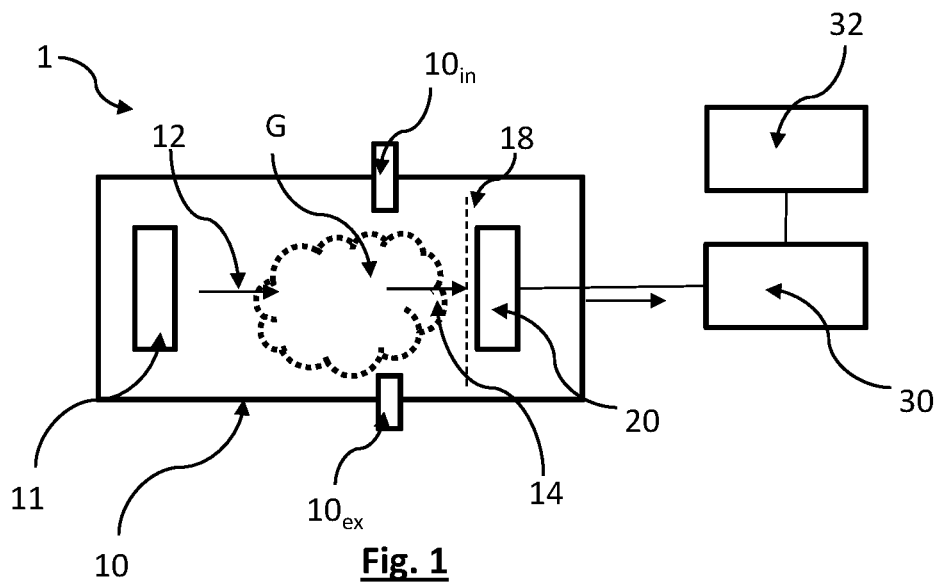
FIG. 1 shows an example of a device for analyzing a gas according to one embodiment.

FIG. 1 is an example of a gas-analyzing device 1. This device comprises a chamber 10 defining an internal space in the interior of which are located:
- a light source 11, able to emit illuminating radiation 12, in an illumination spectrum, so as to illuminate a gas G lying in the internal space;
- a light sensor 20, able to detect light radiation 14 transmitted by the gas G under the effect of its illumination by the illuminating radiation 12.

The chamber may comprise an inlet $10_{in}$ and an outlet $10_{ex}$ allowing gas to enter into and exit from the chamber, respectively. The entry and/or exit of the gas may be forced or spontaneous. Thus, the gas may pass through the chamber via a simple diffusion effect.

The gas G is a gas mixture comprising a plurality of gaseous species $G_1 \ldots G_k \ldots G_K$, K being a positive integer quantifying the number of different gaseous species present in the mixture.

The light source 11 is able to emit the illuminating radiation 12 in a plurality of different illumination spectra $S^1 \ldots S^j \ldots S^J$, which are different from one another, in a given illumination spectral band $\Delta_{12}$, where J is an integer designating the number of spectra. By spectrum, what is meant is a histogram of the intensity $I(\lambda)$ of light radiation as a function of wavelength $\lambda$. The spectrum of the light source defines an illumination spectral band $\Delta_{12}$, the latter possibly extending between the near ultraviolet and the mid-infrared, between 200 nm and 10 μm, and most often between 1 μm and 10 μm.

The device comprises a processor 30, for example a microprocessor. The latter is configured to receive a signal representative of a light intensity detected by the light sensor 20, and to execute the processing operations described below, so as to determine an amount of each sought-after gaseous species. The processor 30 is connected to a memory 32 comprising instructions allowing certain steps of the method described below to be implemented.

According to one embodiment, the various illumination spectra $S^j$ are obtained by modulating a temperature of the light source 11. The latter may then be a light source of black-body or gray-body type. According to another embodiment, the various illumination spectra are obtained using a light source 11 including a plurality of elementary light sources $11_1 \ldots 11_N$, where N is a positive integer designating the number of constituent elementary light sources of the source. The elementary light sources may be light-emitting diodes, the illuminance of which may be modulated so as to form various illumination spectra in the illumination spectral band $\Delta_{12}$.

Figure 2:
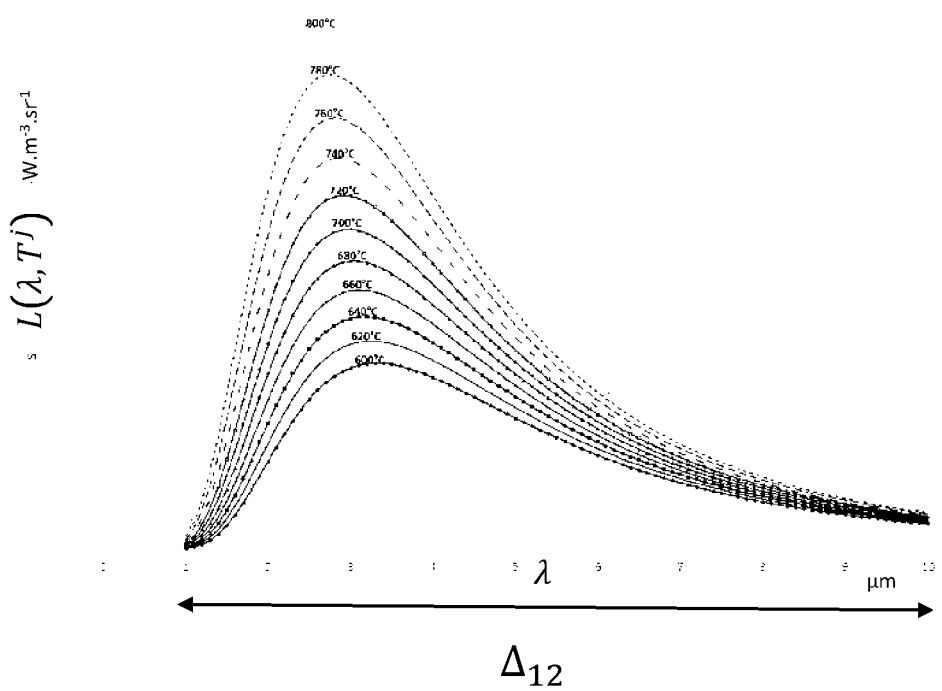
FIG. 2 shows the variation in the illumination spectrum of a light source as a function of temperature.

FIG. 2 shows various illumination spectra $S^j$ of a light source 11, which source may be likened to a source of the type referred to as a black body, as a function of a temperature $T^j$ to which the light source is raised. These spectra follow Planck's law, describing the emission of a black body, i.e. an expression of the type L $$L(\lambda, T^j) = \frac{2hc^2}{\lambda^5} \frac{1}{e^{\frac{hc}{\lambda k T^j}} - 1}, , \quad (1)$$

where
- $L(\lambda, T^j)$ is the spectral luminance, dependent on wavelength $\lambda$ and on the surface temperature $T^j$ of the black body,
- h is Planck's constant,
- k is Boltzmann's constant,
- c is the speed of light in air.

Such a light source is for example obtained via a simple filament heated to a temperature comprised for example between 400° C. and 800° C. In the case of FIG. 2, the variation in the spectral luminance $L(\lambda, T^j)$ has been shown in a temperature range comprised between 600° C. and 800° C. and in an illumination spectral band $\Delta_{12}$ comprised between 1 μm and 10 μm.

This type of source is particularly advantageous, because this allows the illumination spectrum $S^j$ to be modulated via a simple modulation of the temperature $T^j$ of the source. With each temperature $T^j$ is associated one illumination spectrum $S^j$. The modulation of the source temperature may for example be obtained via a simple modulation of a supply current of the light source. In addition, the modulation of the illumination spectrum is non-linear. By non-linear modulation, what is meant is, considering a first illumination spectrum $S^1$ and a second illumination spectrum $S^2$, respectively, the modulation is such that the ratio of the intensities of the illumination spectrum at a first wavelength $\lambda_1$ and a second wavelength $\lambda_2$ is different from one spectrum to the next. This may be expressed by the following relationship:

$$\frac{I^1(\lambda_1)}{I^1(\lambda_2)} \neq \frac{I^2(\lambda_1)}{I^2(\lambda_2)} \quad (2)$$

where $I^j(\lambda_i)$ is the intensity, at a wavelength $\lambda_i$, of the illuminating radiation 12 of spectrum $S^j$.

Most known gaseous species absorb all or some of an electromagnetic emission so as to produce an absorption spectrum containing one or more absorption spectral bands $\Delta_k$, and one or more absorption peaks. The absorption of a gaseous species $G_k$ may be defined by the Beer-Lambert law, according to which:

$$\frac{I(\lambda)}{I_0(\lambda)} = e^{-\mu_k(\lambda)x} \quad (3)$$

where:
- $I(\lambda)$ is the intensity transmitted by the gaseous species $G_k$ at the wavelength $\lambda$, i.e. the intensity of the radiation 14 detected at the wavelength $\lambda$;
- $I_0(\lambda)$ is the intensity incident on the gaseous species $G_k$ at the wavelength $\lambda$, i.e. the intensity of the illuminating radiation 12 at the wavelength $\lambda$;
- $\mu_k(\lambda)$ is a so-called linear absorption coefficient of the gaseous species $G_k$ in question, at the wavelength $\lambda$;
- x is the thickness of gas passed through by the light radiation between the light source and the image sensor.

The linear absorption coefficient $\mu_k(L)$ may be expressed in the form of a product of a linear molar absorption coefficient $\mu_k'(\lambda)$ and of an amount $c_k$ of the gaseous species $G_k$. The linear molar absorption coefficient is the linear absorption coefficient per mole of the gaseous species in question.

Expression (3) then becomes:

$$\frac{I(\lambda)}{I_0(\lambda)} = e^{-\mu_k'(\lambda)c_k x} \quad (4)$$

Thus, $$I(\lambda) = I_0(\lambda)e^{-\mu_k'(\lambda)c_k x} = I_0(\lambda)f^k(c_k, \lambda, x) \quad (5)$$

where $$f^k(c_k, \lambda, x) = e^{-\mu_k'(\lambda)c_k x} = e^{-\mu_k(\lambda)x} \quad (6),$$

$f^k$ designating an absorption spectral function of the gaseous species $G_k$ in the thickness x. This function represents a proportion of the illuminating radiation absorbed by the gaseous species. In order to take into account the fact that all the light rays passing through the gas do not necessarily follow the same path, the thickness x may be a statistical quantity, for example an average or median, representative of a distribution of the paths of various light rays emitted by the source.

If the distribution D(x) of the optical paths is known, it may be taken into account by changing (4) to (4'):

$$\frac{I(\lambda)}{I_0(\lambda)} = \int_x e^{-\mu_k'(\lambda)c_k D(x)} dx \quad (4')$$

Figure 3:
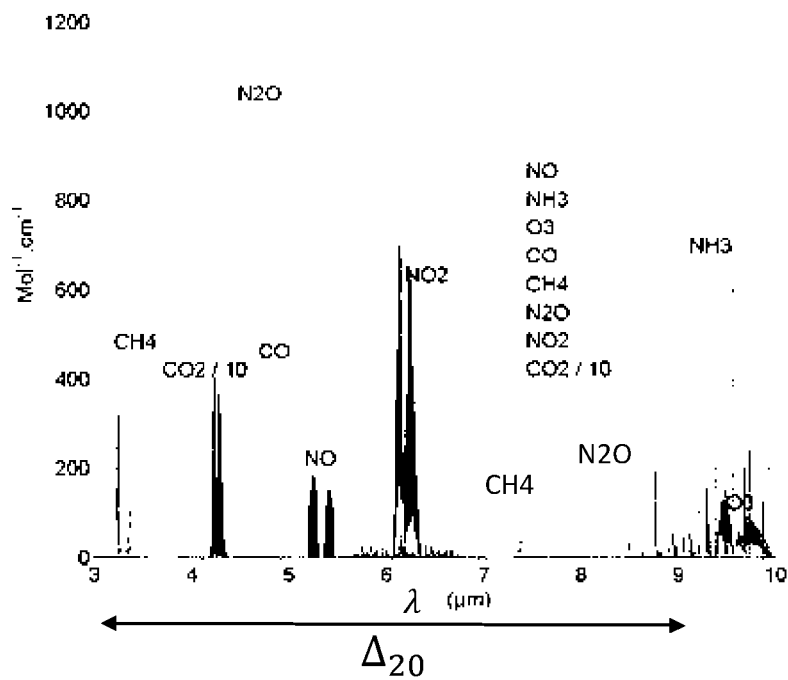
FIG. 3 shows absorbance spectra of various gaseous species.
Figure 4:
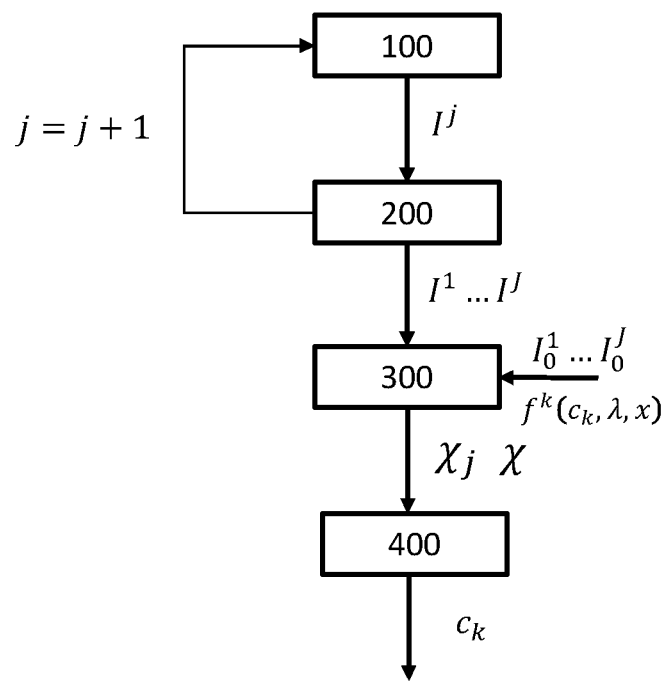
FIG. 4 illustrates the main steps of a method for analyzing a gas according to the invention.

FIG. 3 shows the absorption spectra, i.e. the variation in the linear molecular absorption coefficient $\mu k'(\lambda)$ of various gaseous species, as a function of wavelength. It will be noted that these absorption spectra have absorption peaks in various spectral bands, which are called absorption spectral bands $\Delta_k$.

By absorption peak, what is meant is a local maximum in the variation in the absorption as a function of wavelength. By absorption spectral band $\Delta_k$, what is meant is a spectral band in which the absorption is considered to be significant, i.e. higher than 50 Mol$^{-1}$ cm$^{-1}$, or 100 Mol$^{-1}$ cm$^{-1}$ or even 200 Mol$^{-1}$ cm$^{-1}$ when the absorption is quantified by the linear molar absorption coefficient. $CO_2$, a tenth of the value of the linear molar absorption coefficient of which has been shown, has an absorption spectral band between 4.2 μm and 4.4 μm. $N_2O$ has a first absorption spectral band comprised between 4.3 μm and 4.6 μm, and a second absorption spectral band between 7.5 μm and 8 μm. CO comprises an absorption spectral band between 4.5 μm and 4.8 μm. It may be seen that the absorption spectral bands of $N_2O$ and CO partially overlap.

In the prior art, if it is desired to determine an amount $c_k$ of a gaseous species $G_k$ in a chamber, a wavelength $\lambda$ at which the linear molar attenuation coefficient $\mu_k'(\lambda)$ is high is selected, then the gas containing the gaseous species $G_k$ is illuminated at said wavelength, with an intensity $I_0(\lambda)$. The measurement of an intensity $I(\lambda)$ transmitted by the gas allows the amount $c_k$ of the gaseous species $G_k$ to be determined using expression (3). When there are a plurality of gaseous species, it is possible to successively illuminate the gas at various wavelengths, and/or to carry out a plurality of successive detections of the intensity $I(\lambda)$ using a broad-spectrum light source, each detection being carried out at a wavelength $\lambda$ corresponding to an absorption peak of one sought-after gaseous species. The use of a broad-spectrum light source may also require a specific multiband filter to be used, as described with respect to the prior art.

In contrast to these known prior-art techniques, the invention is based on the use of a light source 11 the illumination spectrum of which extends through the absorption spectral bands of various sought-after gaseous species. Thus, the analyzed gas is illuminated with light radiation 12 in an illumination spectral band $\Delta_{12}$ the spectral width of which is preferably larger than 500 nm, or even than 1 μm, or even than 3 μm. By spectral width, what is meant is a difference between the longest wavelength and the shortest wavelength of the illumination spectral band of the source. The invention is also based on the detection, by the light sensor 20, of the radiation 14 transmitted by the gas G in a detection spectral band $\Delta_{20}$ the spectral width of which is preferably larger than 500 nm, or even than 1 μm, or even than 3 μm. The light sensor is, in this embodiment, not spectrally resolved.

Contrary to the device described in WO2007064370, the light radiation 14 transmitted by the sample is detected by the light sensor 20 in a detection spectral band $\Delta_{20}$ extending continuously between a minimum wavelength $\lambda_{20-min}$ and a maximum wavelength $\lambda_{20-max}$, and comprising the absorption spectral band $\Delta_k$ of at least two candidate gaseous species $G_k$. Preferably, the width of the detection spectral band $\Delta_{20}$ extends without discontinuity over at least 500 nm, or even 1 μm, or even more, for example over a spectral interval larger than 2 μm or than 5 μm. Thus, contrary to the prior art, it is not necessary to interpose a multiband filter having various passbands, each passband of which is suitable for one gaseous species to be detected. Therefore, it is possible, with the same device, to determine the amounts of gaseous species in various mixtures, by adapting the processing, by the processor 30, of the detected intensities, depending on the gaseous species $G_k$ liable to be present in the gas. For example, the detection spectral band $\Delta_{20}$ extends between 3 μm and 8 μm. The same device 1 may then allow the concentrations of $CO_2$, $CH_4$ and CO in a natural-gas mixture to be determined, or the concentrations of NO and $NO_2$ in a mixture of type NOx to be determined. The candidate gaseous species are set beforehand, depending on the application and/or the analyzed gas mixture.

The term continuously means that the signal detected by the light sensor 20 comprises all the wavelengths between the aforementioned minimum wavelength $\lambda_{20-min}$ and maximum wavelength $\lambda_{20-max}$.

One important aspect of the invention is that the analyzed gas G is subjected to a plurality J of successive illuminations, respectively with different illuminating radiation 12, the illuminating radiation used for these successive illuminations having an illumination spectrum $S^j$ that addresses a plurality of absorption spectral bands of the candidate gaseous species. Preferably, the illuminating radiation used for these successive illuminations lies in the same illumination spectral band $\Delta_{12}$ but the spectra $S^j$ thereof, in this spectral band, fluctuate between each illumination.

On each illumination with a spectrum $S^j$, the light sensor 20 detects radiation 14 transmitted by the gas, in the detection spectral band $\Delta_{20}$ described above. The light sensor delivers a signal the intensity $I^j$ of which is representative of the intensity transmitted by the gas when it is illuminated with the illuminating radiation spectrum $S^j$. This intensity is such that:

$$I^j = \int_\lambda I^j(\lambda) = \int_\lambda I^j(\lambda) \Pi_k f^*(c_k,\lambda,x) = I_0^j \int_\lambda \Pi_k f^*(c_k,\lambda,x) \quad (7)$$

where $I_0^j$ is the intensity of the illuminating radiation emitted by the light source. It may be a question of the intensity of a detection signal detected by the light sensor in the absence of gas between the light source 11 and the light sensor 20 following the illumination of the light sensor with illuminating radiation spectrum $S^j$.

If K is the number of gaseous species $G_k$ for which it is desired to determine the amount $c_k$ in the gas G, J detection/illumination sequences are carried out so as to obtain J detection signals, of intensity $I^j$ such as expressed by relationship (7). Each detection signal is preferably detected in the same detection spectral band $\Delta_{20}$. Preferably, the number J of different emission spectra $S^j$ one after the other is higher than or equal to the number K of candidate gaseous species: $J \geq K$.

The measured intensities $I^j$ are processed by the microprocessor 30 connected to the memory 32, in which memory various quantities are stored, notably the absorption spectral functions $f^*(c_k,\lambda,x)$ of each gaseous species. The amount $c_k$ of each candidate gaseous species $G_k$ may then be determined using the following expression:

$$(c_1 \ldots, c_K) = \mathrm{argmin}\, \Sigma_j \sqrt{(I_j)^2 - (\int_\lambda I_0^j(\lambda) \Pi_k f^*(c_k,\lambda,x))^2} = \mathrm{argmin}(\chi) \quad (8)$$

In other words, the sought-after amounts $(c_1 \ldots c_K)$ minimize the expression:

$$\chi = \Sigma_j \chi_j = \Sigma_j \sqrt{(I^j)^2 - (\int_\lambda I_0^j(\lambda) \Pi_k f^*(c_k,\lambda,x))^2} \quad (9)$$

with $$\chi_j = \sqrt{(I^j)^2 - (\int_\lambda I_0^j(\lambda)\Pi_k f^*(c_k,\lambda,x))^2} = (I^j)^2 - I_0^{j\,2}(\int_\lambda \Pi_k f^*(c_k,\lambda,x))^2 \quad (10)$$

That is $$\chi_j = (I^j)^2 - (\hat{I}^j(c_k))^2 \quad (11)$$

Thus, the sought-after amounts $c_k$ are obtained by determining an indicator $\chi_j$ representing a comparison between:
- the light intensity $I^j$ of the radiation transmitted by the gas, which intensity is measured by the light sensor 20, following an illumination of the gas with an illumination spectrum $S^j$;
- an estimate $\hat{I}^j(c_k)$ of the measured intensity dependent on the amounts $c_k$ of the candidate gaseous species. This estimate is obtained taking into account the light intensity $I_0^j$ of the illuminating radiation 12 produced by the light source 11, which is multiplied by a quantity representative of the absorption of each candidate gaseous species $G_k$. This quantity may be obtained via a product of the absorption spectral products functions $f^*(c_k,\lambda,x)$ of each candidate gaseous species.

One comparison indicator $\chi_j$ may be established for each illumination of the sample with one illumination spectrum $S^j$. Then, as many comparison indicators $\chi_j$ as there are successive illuminations are obtained, these comparison indicators being able to be combined, for example in the form of a sum as expressed in equation (9), so as to establish an overall criterion of comparison $\chi$. The sought-after amounts $c_k$ are those for which the overall criterion of comparison approaches a preset value.

In the example described above, the comparison $\chi_j$ takes the form of a quadratic error, as expressed by relationship (9). The sought-after amounts $c_k$ are those that minimize the overall criterion of comparison $\chi$. The comparison may take other forms, for example a ratio, in which case the sought-after amounts are those for which each comparison indicator $\chi_j$ has a value closest to 1.

The term amount $c_k$ of a candidate gaseous species may mean a number of molecules, a mass, or a concentration, i.e. an amount per unit volume or mass.

The main steps of a detecting method according to the invention will now be summarized with reference to FIG. 3.

In an illuminating step 100, the analyzed gas is illuminated with an illumination spectrum $S_j$ by the light source 11. The light sensor acquires a detection signal the intensity $I^j$ of which, corresponding to the intensity $I^j$ of the radiation transmitted by the gas in the detection spectral band, is determined.

In a loop-exiting step 200, it is determined whether the analyzed gas has been subjected to a sufficient number of illuminations with different illumination spectra $S^j$. If this condition is not met, the light source 11 is adjusted, so as to modify the illumination spectrum $S^j$, and a new detection signal is acquired in the detection spectral band $\Delta_{20}$. When a sufficient number of illuminations has been carried out, the method passes on to step 300 of forming a comparison indicator $\chi_j$ associated with each illumination. This indicator takes into account an intensity $I_0^j$ of the illuminating radiation 12 emitted by the light source. This corresponds to the intensity that would be detected by the light sensor 20 in the absence of gas between the light source and the light sensor, the light source emitting with the illumination spectrum $S^j$.

Figure 5A:
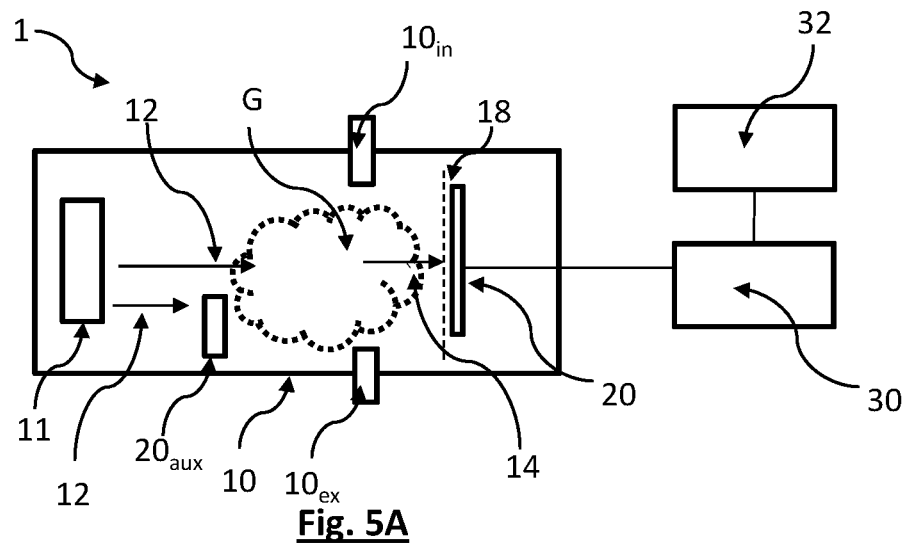
FIGS. 5A and 5B show embodiments implementing an auxiliary light sensor.
Figure 5B:
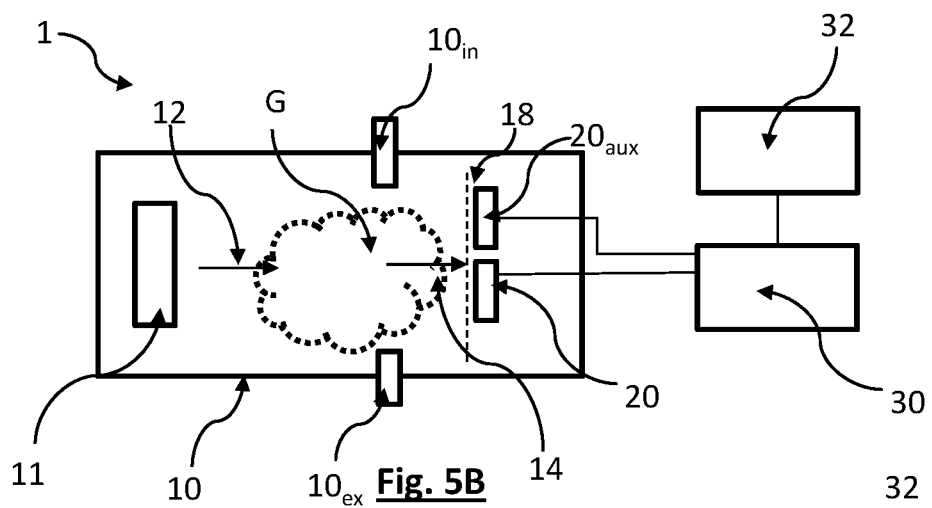

The intensity $I_0^j$ of the illuminating radiation 12 emitted by the light source may be detected by the light sensor 20 in the absence of gas between the light source and the light sensor, the light source emitting with the illumination spectrum $S^j$. It may also be determined by an auxiliary light sensor $20_{aux}$, placed facing the light source, as shown in FIG. 5A. In this case, there is no gas between the auxiliary light sensor and the light source. The intensity of the illuminating radiation emitted by the light source may also be estimated by employing an auxiliary light sensor $20_{aux}$, the detection spectral band of which (called the auxiliary detection spectral band) is not impacted, or impacted in a way deemed to be negligible, by the absorption spectral bands of the candidate gaseous species. Such a configuration is shown in FIG. 5B. For example, when the gas mixture is air, the detection spectral band may be a narrow band (i.e. a band the spectral width of which is smaller than 100 nm or even 50 nm) centered on about 3.9 µm. The intensity $I_0^j$ of the illuminating radiation may then be determined, for example on the basis of prior knowledge of the shape of the illumination spectrum.

In a minimizing step 400, the amounts of candidate gaseous species optimizing the overall criterion of comparison $\chi$ formed from the various comparison indicators $\chi_j$ are determined. When the overall criterion of comparison corresponds to that expressed by relationship (9), the sought-after amounts minimize its value, by making it tend toward 0.

Steps 300 and 400 are implemented by the processor 30, and are adapted to the sought-after candidate species, in particular by taking into account the absorption functions $f^k(c_k,\lambda,x)$ of the candidate species. Thus, the same device may be used whatever the gas mixture in question, the processor taking into account the absorption spectral functions of the gaseous species liable to be present in the mixture. It is not necessary to physically adapt the device 1 by interposing a multiband filter as suggested in the prior art.

According to one embodiment, a passband filter 18 is interposed between the light source 11 and the light sensor 20, so as to prevent detection of light radiation in a spectral band of the absorption spectrum of water vapor. Specifically, moisture may induce significant absorption liable to corrupt the measurements. In this case, a passband filter allows spectral bands significantly impacted by this absorption to be rejected. These spectral bands are located at about 2.6 µm and between 5.5 and 7.5 µm. This does not prevent at least one continuous detection spectral band from containing detection peaks of at least two candidate gaseous species.

Figure 6:
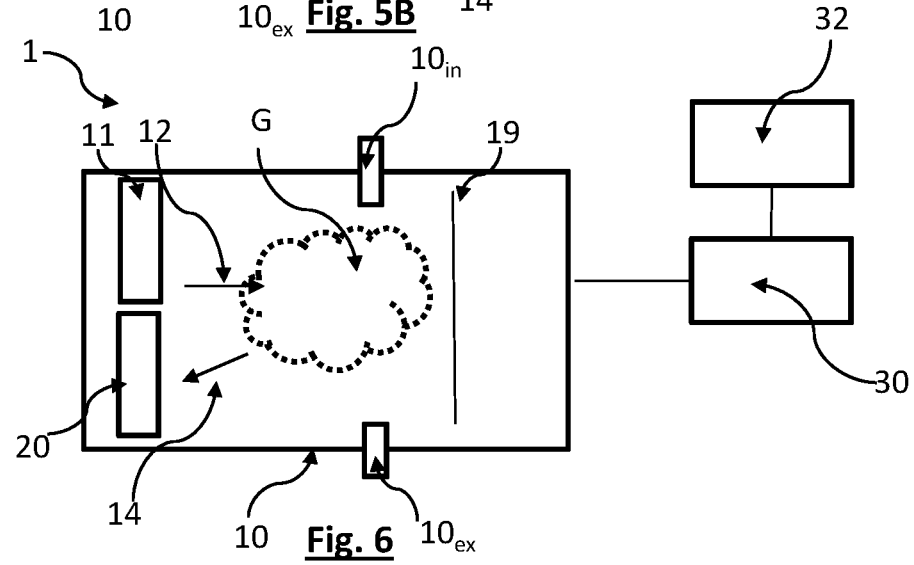
FIG. 6 shows an example of a device according to another embodiment.

According to one embodiment, the light sensor is placed adjacent to the source, as illustrated in FIG. 6. The device comprises a reflective surface 19 able to reflect the radiation 12 emitted by the source, and having passed through the gas, toward the light sensor. This configuration is said to be a "reflective" configuration as opposed to a "transmissive" configuration in which the analyzed gas lies between the light source and the light sensor. A reflective configuration tends to lengthen the path of the radiation through the gas, this increasing the sensitivity of the device.

The invention will possibly be implemented to analyze air quality, to analyze natural gas, or to detect target gaseous species, for example toxic gaseous species.

The invention claimed is:

1. A method for analyzing a gas, in order to estimate an amount of a plurality of different candidate gaseous species potentially present in the gas, each candidate gaseous species absorbing light radiation in an absorption spectral band, the method comprising:

a) placing the gas between a light source and a light sensor, the light source being configured to emit an illuminating radiation that propagates through the gas, the light sensor being configured to detect a radiation transmitted by the gas and to generate a detection signal representative of an intensity of the detected radiation;

b) illuminating the gas using the light source, the illuminating radiation lying in an illumination spectral band covering the absorption spectral bands of a plurality of candidate gaseous species, the illuminating radiation having a spectral luminance within the illumination spectral band, the illuminating spectrum representing a distribution of the intensity of the illuminating radiation as a function of wavelength;

c) during b), detecting, with the light sensor, a radiation transmitted by the gas in at least one detection spectral band extending continuously between a minimum wavelength and a maximum wavelength;

d) reiterating b) and c), while adjusting the light source such that, in each iteration of b), the spectral luminance is modified, without adjustment of a filter, placed between the light source and the gas, between each iteration;

e) estimating an amount of each of the candidate gaseous species depending on the intensities of the radiation detected in each iteration of c), respectively, each detected intensity being associated with one spectral luminance;

wherein,
in c), the detection spectral band is larger than 1 μm,
in each iteration of c), the detection spectral band covers absorption spectral bands of a plurality of candidate gaseous species, and
in each iteration of b) and c), the spectral luminance is modified in the same illumination spectral band,
so that each iteration of c) results in an light intensity of the radiation transmitted by the gas, within the same detection spectral band.

2. The method of claim 1, wherein at least two candidate gaseous species have a molar absorption coefficient higher than 50 $Mol^{-1}$ $cm^{-1}$ in the detection spectral band.

3. The method of claim 1, wherein e) further comprises forming comparison indicators, each comparison indicator representing a comparison between:
the intensity of the radiation detected by the light sensor in each c) following an illumination of the gas with the spectral luminance;
an estimation of the intensity of the radiation detected by the light sensor in c), the estimation being dependent on amounts of the candidate gaseous species;
so that each comparison indicator is established with respect to each spectral luminance;
and wherein e) further comprises determining an overall criterion of comparison from the comparison indicators, so that the amounts of the candidate gaseous species are those for which the overall criterion of comparison tends toward a preset value.

4. The method of claim 3, wherein each intensity of the radiation detected by the light sensor is estimated by:
associating, with each candidate gaseous species, an absorption spectral function dependent on the amount of the candidate gaseous species;
taking into account an intensity of the illuminating radiation emitted by the light source;
the intensity of the radiation detected by the light sensor being estimated by multiplying the intensity of the illuminating radiation emitted by the light source by the absorption spectral functions associated with each candidate gaseous species.

5. The method of claim 1, wherein the light source is a source that emits illuminating radiation the spectral luminance of which varies, within the illumination spectral band, as a function of a temperature of the light source, such that, in each step b), the temperature of the source is modified.

6. The method of claim 1, wherein the light source comprises elementary light sources that are configured to be activated independently of one another, so as to allow the spectral luminance to be modulated within the illumination spectral band.

7. The method of claim 1, wherein the detection spectral band lies between 200 nm and 10 μm or between 1 μm and 10 μm.

8. The method of claim 1, wherein, during at least two illuminations, the spectral luminance comprises a first wavelength and a second wavelength, the ratio of the intensity of the illuminating radiation at the first wavelength to the intensity of the illuminating radiation at the second wavelength being different between said illuminations.

9. The method of claim 1, comprising, prior to e), defining the candidate gaseous species liable to be present in the gas.

10. The method of claim 1, wherein the absorption spectral bands of at least two candidate gaseous species at least partially overlap.

11. The method of claim 1, wherein the detection spectral band is larger than 3 μm.

12. A device for analyzing a gas, comprising:
a light source, configured to emit light radiation, the light source being configured to be modulated such that the spectral luminance of the emitted light radiation, is tunable in an illumination spectral band;
a light sensor, able to detect light radiation in a detection spectral band;
a chamber, configured to receive the gas, the chamber being arranged such that the light sensor is configured to detect light radiation having passed through the gas;
a processor, configured to implement step e) of a method of claim 1, on the basis of the intensities of radiations detected by the light sensor following various illuminations of the gas, with various spectral luminances, respectively.

* * * * *